United States Patent Office 3,057,283
Patented Oct. 9, 1962

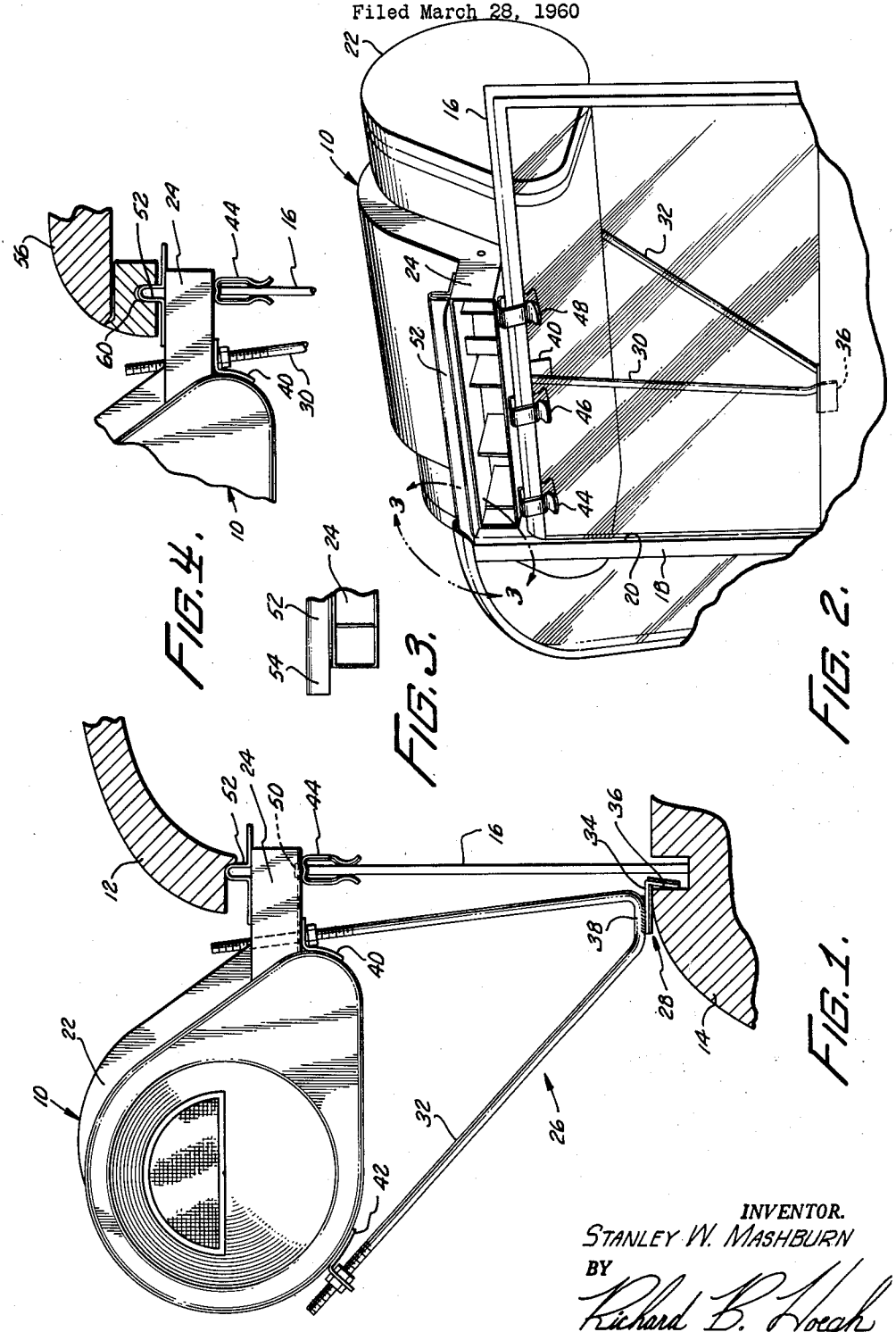

3,057,283
AUTOMOBILE WINDOW MOUNTING FOR AN
EVAPORATIVE COOLER
Stanley W. Mashburn, 33 Palermo Walk,
Long Beach, Calif.
Filed Mar. 28, 1960, Ser. No. 17,848
1 Claim. (Cl. 98—2)

This invention relates to apparatus for mounting an evaporative cooler on an automobile adjacent the exterior of a door window. Such coolers quite generally comprise a body, and a discharge duct protruding laterally from the inboard side of the body and adapted to extend over the top of a partially lowered window for channeling cooled air into the automobile.

The mounting of a car cooler on an automobile raises several problems, both for the manufacturer and for the ultimate user. From the manufacturer's point of view, and aside from pleasing the user, it is desirable to have a mounting arrangement which is simple in construction, and universal in application to both sedan type automobiles and convertible or hard top convertible type automobiles as well as to different makes and models within these types. From the user's point of view, which of course is also of great interest to the manufacturer, the problems are the effectiveness of mounting, the ease with which it may be installed and removed, and the wear and tear it may effect upon his automobile. In the latter regard, window breakage has been a troublesome problem in the past, particularly with hard top and convertible models, because conventional mountings have relied too much for support on rigid mounting to the window glass.

The present invention combines solutions to all of these problems to the extent that it reflects a heretofore unachieved compromise of desirable characteristics which are by their nature competing, in that the solution of one generally tends to defeat the solution of another.

In accordance with the present invention there is provided a mounting apparatus which includes in combination a brace having a footing adapted to seat on the exterior of the automobile door and having first and second divergent arms connected to the footing and extending upwardly therefrom, means for connecting the first and second arms to the inboard side and outboard side of the cooler respectively, and a plurality of flexible spring clips depending from the bottom side of the discharge duct of the cooler for gripping the upper edge of the window glass.

In the preferred embodiment of the invention, the brace is formed by a single elongated rod bent approximately in the form of a truncated V and connected at its base to a base portion of the footing which is adapted to seat on the window sill formed by the outside door panel. The footing includes a depending support for insertion into the space between the window glass and the sill. The arms of the brace formed by the rod are semi-rigid in that they are capable of being flexed outwardly or inwardly, for accommodating the adjustment of the vertical portion of the supported cooler relative to the brace. The adjustment is accomplished by means of threads formed on the respective ends of the rod, the threads on each end of the rod running for a distance sufficient to define a usable magnitude of adjustability of the vertical portion of the cooler. The positioning of the cooler on the brace is effected by means of nuts on the threaded ends of the rod. The mounting apparatus further includes a member connected to the top of the discharge duct and forming a ridge thereon adapted for insertion into the window receiving channel in the upper door frame. This member protrudes past the forward side of the discharge duct so as to form a protruding tongue for insertion into the window way in the rear of the wind wing support.

A preferred embodiment of the invention is illustrated in the accompanying drawings, in which:

FIG. 1 is a front elevation of the preferred embodiment of the mounting apparatus of the invention, shown mounting a car cooler on the right front door of a hard top convertible type automobile;

FIG. 2 is a perspective view of the apparatus depicted in FIG. 1, taken from the inboard side of the automobile door;

FIG. 3 is a fragmentary elevation, partially cut away, of area 3—3 of FIG. 2; and FIG. 4 is a fragmentary front elevation of the mounting apparatus of the invention, depicting its installation on a sedan type automobile.

Referring now to FIGS. 1 and 2, the mounting apparatus of the invention mounts an evaporative cooler 10 on a hard top convertible automobile having a roof 12, a right front outer door panel 14 and a right front door window glass 16. The automobile further includes a right door wind wing support bar 18, in the rear of which there is formed a window way 20 in which the forward edge of the window glass 16 rides.

The car cooler has a body 22 and a substantially rectangular discharge duct 24 protruding laterally from the inboard side of the body and extending over the top of the window glass 16, which is in a partially lowered position. The position in which the car cooler must be maintained is obvious from the drawings.

The mounting apparatus of the present invention, which maintains the position of the car cooler, includes a brace 26 having a footing 28 and also having first and second divergent arms 30, 32 connected to the footing and extending upwardly therefrom. The footing includes a base 34 which is padded on its underside and which seats on the window sill formed by the outside door panel, and also includes a depending support 36 which fits into the space between the window glass and the sill, the support being padded as shown on the side facing the window glass. The divergent arms of the brace are formed by a single steel rod bent approximately in the form of a truncated V having a base 38 which is welded to the base 34 of the footing. The rod affords a semi-rigid unitary structure providing arms which are somewhat flexible to accommodate adjusting the position of the cooler.

A first mounting bracket 40 is welded to the inboard side of the cooler beneath the discharge duct, and a second mounting bracket 42 is welded to the outboard side of the cooler. The mounting brackets are located about midway along the length of the cooler, and have holes therein (not shown) for receiving the first and second rod arms 30, 32 respectively. In each case, the respective arm of the rod extends through the associated mounting bracket; and in the case of the first arm 30, this end of the rod extends completely through the discharge duct and protrudes past the upper surface thereof through a hole (not shown) in the top of the discharge duct.

Threads are formed on the ends of the respective arms of the rod as shown, the threads on each end running for a substantial distance along the length of the rod to define a usable magnitude of adjustability of the vertical position of the cooler on the brace. The position of the cooler on the brace is fixed by means of cooperating lock nuts, as shown. The mounting brackets, the threaded ends of the rod, and the lock nuts, taken together with the slight flexibility of the semi-rigid arms 32, 30 of the rod, act as a means for adjusting the vertical position of the cooler on the brace to adapt to windows of different automobiles. Also, this structure connects the brace to the cooler. Hence, it has a double function.

First, second and third spring clips 44, 46, 48 depend from the bottom side of the discharge duct 24, and exert a spring grip upon the upper edge of the window glass 16. Each spring clip is lined with an energy absorbing material such as cork. As shown typically in FIG. 1 for the first spring clip 44, the clip is connected to the discharge duct by means of a brad 50 extending through the bottom wall of the duct. This point form of connection tends to yield slightly and enhances the ability of the spring clip to take shock forces off the window glass.

A sealing member or guide bar 52 is welded to the top of the discharge duct and forms a ridge thereon. As best shown in FIGS. 2 and 3, the sealing member protrudes past the forward side of the discharge duct so as to form a tongue 54 for insertion into the upper end of the window way 20 in the rear of the wind wing support 18.

Referring now to FIG. 4, a sedan type automobile includes a roof 56 and an upper right front door frame 58. The upper door frame 58 is not present in the hard top convertible or convertible models. The upper door frame has provided therein a window receiving channel 60, into which fits the guide bar 52. This provides additional support for the cooler, available however only on sedans. It is to be noted that the mounting apparatus of the present invention, while taking advantage of this additional support on sedan types, is, without modification, directly adaptable to hard top and convertible type automobiles.

The car cooler 10 is easily mounted on a hard top convertible automobile by the following procedure. The arms 30, 32 of the brace are inserted through the brackets 40, 42 respectively until the brackets seat on the lower lock nuts. With the window 16 partially raised, the assembled bracket and cooler is dropped into position by snapping the spring clips 44, 46, 48 over the top edge of the window glass. The window is lowered until the base 34 of the foot seats on the window sill formed by the outside door panel 14 with the dependent support 36 resting between the glass and the sill. The cooler is then slid forward until the tongue 54 slips into the rear of the wind wing support 18. The window is then raised until the tongue 54 fits snugly at the top of the wind wing support. The position of the lock nuts is then adjusted until the bottom nuts are firm against the bottom of the brackets on the cooler. A top nut, as shown, is employed on the outboard arm 32. Such is not needed on the inboard arm.

In conventional mounting apparatus for convertible or hard top types, the cooler is clamped firmly to the upper edge of the window glass, so that any twisting motion on the cooler breaks the glass immediately. Also, any shock from slamming the door is passed directly to the glass, which also tends to break it. According to the present invention, this problem is solved by the employment of the flexible spring clips in combination with the other mounting structure, the spring clips acting as a shock absorber in taking any strain off the glass. The employment of the spring clips is permitted by the use of the two-armed brace, the inboard arm of which carries most of the weight of the cooler, with the outboard arm stabilizing the cooler. This has the further effect of eliminating the weight from the window lift mechanism, hence preventing any wear on this part of the door.

The guide bar forming the ridge along the top side of the discharge duct seals the top of the duct both in the case of sedan type automobiles and convertible types. The protruding end of this member, which is the tongue 54 for insertion into the window way in the rear of the wind wing support, acts both as a stop to keep the window from raising too high, and also utilizes the wind wing support for additional bracing, thereby taking a further lateral load off the glass.

I claim:

In apparatus for mounting an evaporative cooler on an automobile adjacent the exterior of a door window, the cooler having a body and a discharge duct protruding laterally from the inboard side of the body and adapted to extend over the top of a partially lowered window for channelizing cooled air into the automobile, the combination which comprises a brace having a footing adapted to seat on the exterior of the door and having first and second divergent arms connected to the footing and extending upwardly from the footing, means for connecting the first and second arms to the inboard side and outboard side of the cooler respectively, a plurality of flexible spring clips depending from the bottom side of the discharge duct for gripping the upper edge of the window glass, and a tongue protruding forward from the discharge duct for insertion into the window way in the rear of the wind wing support, a member connected to the top of the discharge duct and forming a ridge thereon adapted for insertion into the window receiving channel in the upper door frame of a sedan, said member protruding past the forward side of the discharge duct so as to form said tongue.

References Cited in the file of this patent

UNITED STATES PATENTS

| | | |
|---|---|---|
| 1,608,785 | Evans | Nov. 30, 1926 |
| 2,454,368 | Auskelis | Nov. 23, 1948 |
| 2,717,773 | Gregg | Sept. 13, 1955 |
| 2,780,928 | Bullock | Feb. 12, 1957 |